US012643400B2

(12) United States Patent
Tanaka et al.

(10) Patent No.: US 12,643,400 B2
(45) Date of Patent: Jun. 2, 2026

(54) DISPLAY CONTROL APPARATUS, DISPLAY CONTROL METHOD, AND RECORDING MEDIUM

(71) Applicant: HONDA MOTOR CO., LTD., Tokyo (JP)

(72) Inventors: Ryosuke Tanaka, Tokyo (JP); Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 40 days.

(21) Appl. No.: 18/782,409

(22) Filed: Jul. 24, 2024

(65) Prior Publication Data

US 2025/0033473 A1     Jan. 30, 2025

(30) Foreign Application Priority Data

Jul. 27, 2023     (JP) ................................. 2023-122232

(51) Int. Cl.
| | |
|---|---|
| *B60K 35/10* | (2024.01) |
| *B60K 35/22* | (2024.01) |
| *B60K 35/28* | (2024.01) |
| *B60K 35/29* | (2024.01) |
| *B60K 35/85* | (2024.01) |

(Continued)

(52) U.S. Cl.
CPC .............. *B60K 35/10* (2024.01); *B60K 35/22* (2024.01); *B60K 35/28* (2024.01); *B60K 35/29* (2024.01); *B60K 35/85* (2024.01); *B60W 40/10* (2013.01); *B60K 2360/1438* (2024.01); *B60K 2360/1515* (2024.01); *B60K 2360/175* (2024.01); *B60K 2360/1868* (2024.01); *B60R 2011/0003* (2013.01)

(58) Field of Classification Search
CPC ............ B60K 35/10; B60K 2360/1438; B60K 2360/1515; B60K 2360/175; B60K 2360/182; B60K 35/22; B60K 35/28; B60K 35/29; B60K 35/81; B60K 35/85; B60K 2360/1868; B60W 40/10; B60R 11/0229; B60R 2011/0003
See application file for complete search history.

(56) References Cited

U.S. PATENT DOCUMENTS

| | | | |
|---|---|---|---|
| 2008/0143505 A1* | 6/2008 | Maruyama ............. | B60K 35/60 701/532 |
| 2019/0302583 A1 | 10/2019 | Taniguchi et al. | |
| 2020/0286450 A1* | 9/2020 | Furuya .................... | G06F 3/147 |

(Continued)

FOREIGN PATENT DOCUMENTS

| | | | |
|---|---|---|---|
| JP | 2019-174693 A | 10/2019 | |

*Primary Examiner* — Rodney A Butler
(74) *Attorney, Agent, or Firm* — Rankin, Hill & Clark LLP

(57)          ABSTRACT

A display control apparatus includes a display control section configured to, when an interactive communication recognition section recognizes that interactive communication is taking place between a mobile body and a communication entity, display predetermined information transmitted by the communication entity to the mobile body through the interactive communication on a first display disposed in front of a driver seat of the mobile body and display an operation image for receiving an instructing operation related to the interactive communication on a second display of a touch panel type disposed diagonally forward of the driver seat of the mobile body.

5 Claims, 7 Drawing Sheets

(51) Int. Cl.
    *B60W 40/10*       (2012.01)
    *B60R 11/00*       (2006.01)

(56)           References Cited

U.S. PATENT DOCUMENTS

2022/0161813 A1*    5/2022   Oba ................... B60W 60/0053
2023/0302902 A1*    9/2023   Imamura ............... B60K 35/81

* cited by examiner

DISPLAY CONTROL APPARATUS, DISPLAY CONTROL METHOD, AND RECORDING MEDIUM

INCORPORATION BY REFERENCE

The present application claims priority under 35 U.S.C. § 119 to Japanese Patent Application No. 2023-122232 filed on Jul. 27, 2023. The content of the application is incorporated herein by reference in its entirety.

BACKGROUND OF THE INVENTION

Field of the Invention

The present invention relates to a display control apparatus, a display control method, and a recording medium.

Description of the Related Art

In recent years, efforts have actively been made to provide access to sustainable transportation systems that are considerate of traffic participants, especially those in vulnerable positions, such as older people, people with disabilities, and children. To achieve this, focus is placed on research and development to further improve the safety and convenience of traffic through comfort-related development for vehicle.

For example, Japanese Patent Laid-Open No. 2019-174693 discloses a configuration in which, when a vehicle passenger participates in a virtual meeting, a speaker installed in the vehicle is switched between an output mode and a non-output mode and the sensitivity of a microphone for the passenger's voice is adjusted, in accordance with the condition of the vehicle.

It is desirable that a vehicle driver be able to view information on a display and perform necessary operations easily when the driver uses a service through interactive communication, such as participation in a virtual meeting or viewing of on-demand content. A challenge to be solved by the present application is to provide an environment that allows a vehicle driver to view information on a display and perform necessary operations easily when the driver uses a service through interactive communication.

To solve the challenge described above, an object of the present application is to provide a display control apparatus, a display control method, and a recording medium that provide an environment that allows a driver of a mobile body, such as a vehicle, to view information on a display and perform necessary operations easily when the driver uses a service through interactive communication. Consequently, the present application aims to contribute to the advance of a sustainable transportation system.

SUMMARY OF THE INVENTION

A first aspect to achieve the object described above may be a display control apparatus including: an interactive communication recognition section configured to recognize that interactive communication is taking place between a mobile body and a communication entity external to the mobile body; and a display control section configured to, when the interactive communication recognition section recognizes that interactive communication is taking place between the mobile body and the communication entity, display predetermined information transmitted by the communication entity to the mobile body through the interactive communication on a first display disposed in front of a driver seat of the mobile body and display an operation image for receiving an instructing operation related to the interactive communication on a second display of a touch panel type disposed diagonally forward of the driver seat of the mobile body.

The display control apparatus described above may include a drive situation recognition section configured to recognize a drive situation of the mobile body, wherein the display control section changes what is displayed on the first display in accordance with a drive situation of the mobile body recognized by the drive situation recognition section.

In the display control apparatus described above, the display control section may be configured to display the predetermined information on the first display when the drive situation recognition section recognizes that the mobile body is in an automated driving mode.

In the display control apparatus described above, the display control section may be configured to, in accordance with a drive situation of the mobile body recognized by the drive situation recognition section, switch between: a first mode in which only travel situation information indicative of a travel situation of the mobile body, from among the travel situation information and the predetermined information, is displayed on the first display; a second mode in which only the predetermined information, from among the travel situation information and the predetermined information, is displayed on the first display; and a third mode in which the travel situation information and the predetermined information are displayed on the first display.

In the display control apparatus described above, the display control section may be configured to, in the third mode, decrease a display range for the travel situation information on the first display to be smaller than a display range for the predetermined information on the first display.

In the display control apparatus described above, the predetermined information may include a virtual meeting screen transmitted by the communication entity to the mobile body in response to participation in a virtual meeting from the mobile body.

A second aspect to achieve the object described above may be a display control method to be executed by a computer, the method including: an interactive communication recognition step of recognizing that interactive communication is taking place between a mobile body and a communication entity external to the mobile body; and a display control step of, when the interactive communication recognition step recognizes that interactive communication is taking place between the mobile body and the communication entity, displaying predetermined information transmitted by the communication entity to the mobile body through the interactive communication on a first display disposed in front of a driver seat of the mobile body and displaying an operation image for receiving an instructing operation related to the interactive communication on a second display of a touch panel type disposed diagonally forward of the driver seat of the mobile body.

A third aspect to achieve the object described above may be a non-transitory recording medium storing a program that causes a computer to function as: an interactive communication recognition section that recognizes that interactive communication is taking place between a mobile body and a communication entity external to the mobile body; and a display control section that, when the interactive communication recognition section recognizes that interactive communication is taking place between the mobile body and the communication entity, displays predetermined information transmitted by the communication entity to the mobile body through the interactive communication on a first display disposed in front of a driver seat of the mobile body and displays an operation image for receiving an instructing operation related to the interactive communication on a second display of a touch panel type disposed diagonally forward of the driver seat of the mobile body.

By using the display control apparatus, the display control method, and the recording medium described above, an environment can be provided that allows a driver of a mobile body, such as a vehicle, to view information on a display and perform necessary operations easily when the driver uses a service through interactive communication.

DETAILED DESCRIPTION OF THE PREFERRED EMBODIMENTS

1. Configuration of Display Control Apparatus

Figure 1:
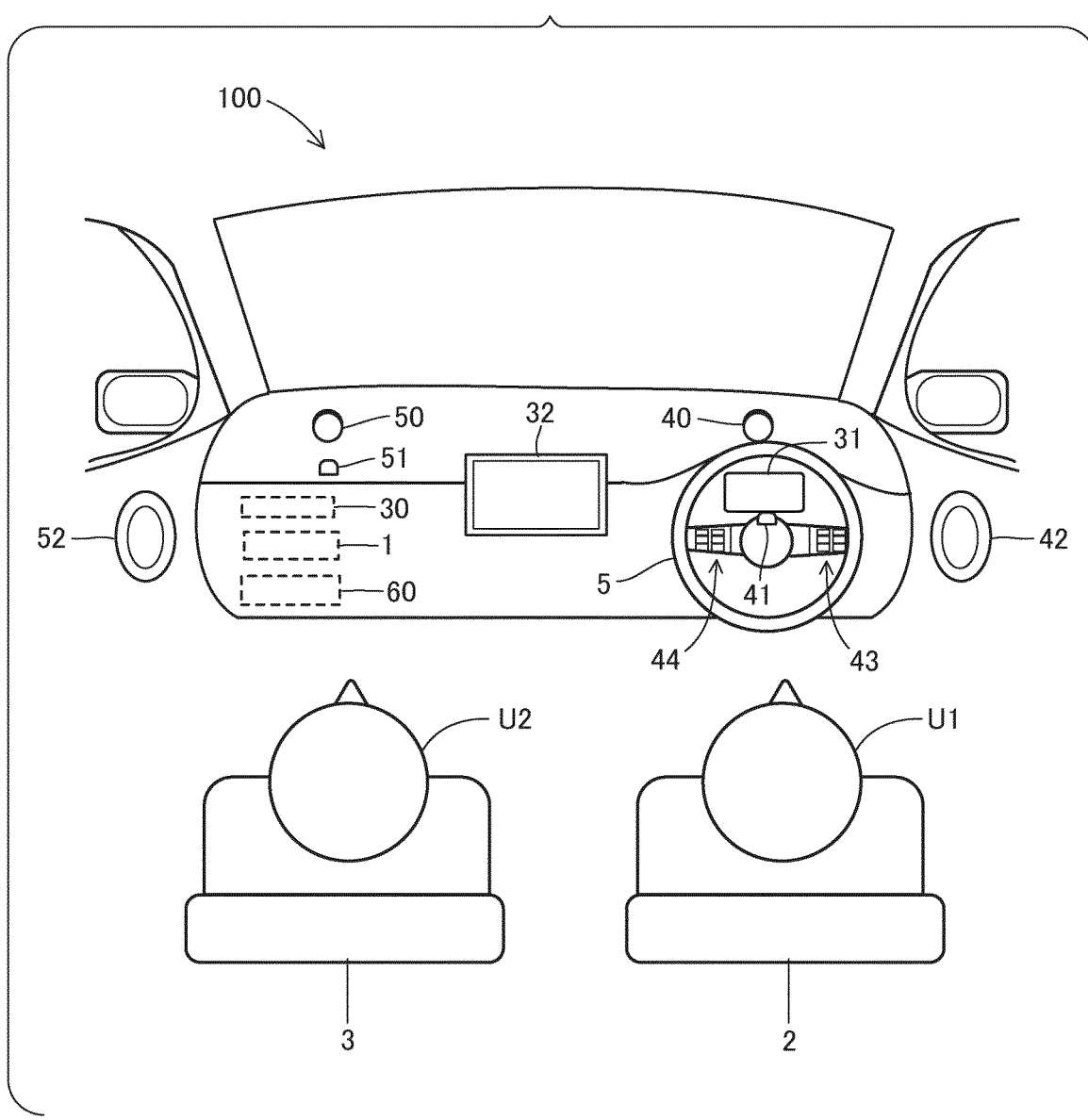
FIG. 1 is a configuration diagram of a vehicle including a display control apparatus.
Figure 2:
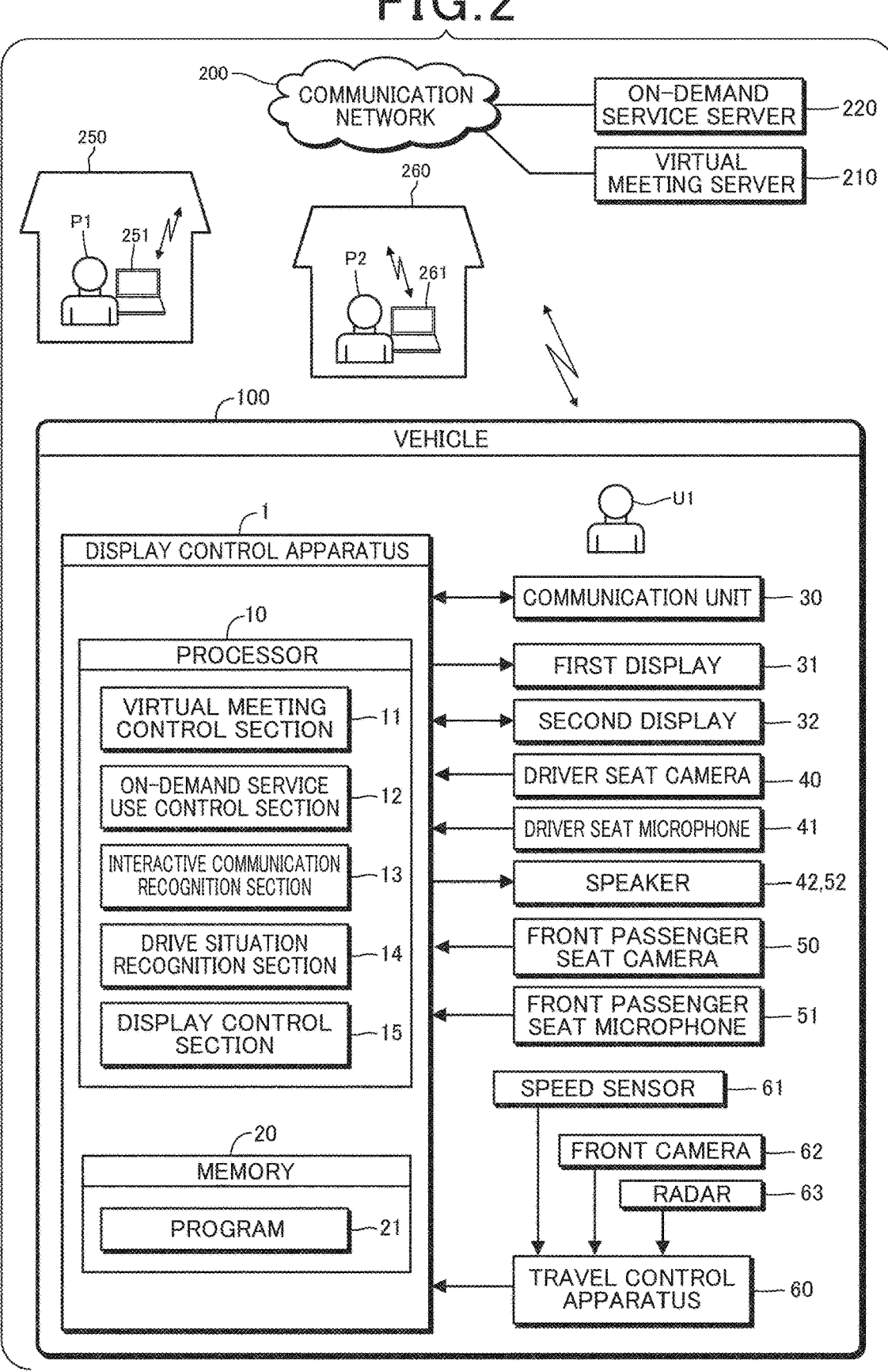
FIG. 2 is a configuration diagram of the display control apparatus shown in FIG. 1.
Figure 3:
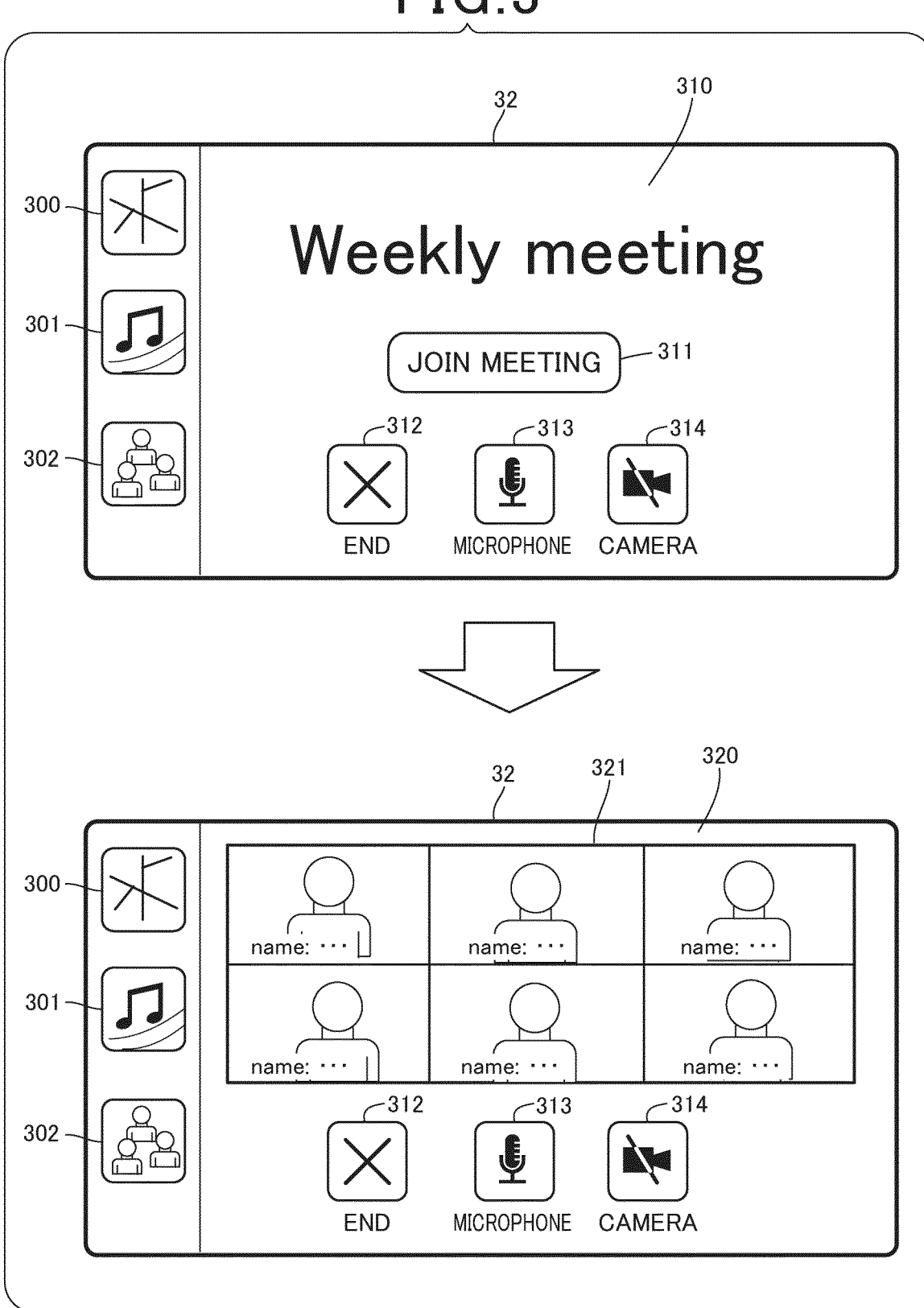
FIG. 3 is a diagram for describing a screen of a second display that accommodates a virtual meeting.

Referring to FIGS. 1 to 3, a configuration of a display control apparatus 1 in the present disclosure is described. As shown in FIG. 1, the display control apparatus 1 is mounted in a vehicle 100 and controls screen display of a first display 31 located in front of a driver seat 2 and screen display of a second display 32 located diagonally forward left of the driver seat 2. If the driver seat 2 is located on the left side of the vehicle 100, the second display 32 is located diagonally forward right of the driver seat 2. The vehicle 100 corresponds to a mobile body of the present disclosure.

The first display 31 and the second display 32 are full dot type displays, such as a liquid crystal display or an organic electroluminescent display. The second display 32, which is a touch panel type, has a touch sensor on its surface. The vehicle 100 includes: a communication unit 30 that communicates with a communication entity that is external to the vehicle 100; and a travel control apparatus 60 that controls travel of the vehicle 100.

The travel control apparatus 60 performs control: manual driving control that controls the operation of a drive system (an engine, an electric motor, etc.) of the vehicle 100 in response to an operation by the driver U1 on an operation portion such as an acceleration pedal, a brake pedal, and a steering wheel 5; driving assistance control that provides assistance to the driver U1 in driving operation; and automated driving control that drives the vehicle 100 without the operation by the driver U1.

A driver seat camera 40 for capturing an image of the driver U1 and a driver seat microphone 41 for collecting speech of the driver U1 are located forward of the driver seat 2. A front passenger seat camera 50 for capturing an image of a passenger U2 seated in a front passenger seat 3 and a front passenger seat microphone 51 for collecting speech of the passenger U2 are located forward of the front passenger seat 3. The driver U1 can use a service through interactive communication, such as a virtual meeting or on-demand content provision, by using at least one of the driver seat camera 40 and the driver seat microphone 41.

Similarly, the passenger U2 can use a service through interactive communication by using at least one of the front passenger seat camera 50 and the front passenger seat microphone 51. Information of content obtained through the interactive communication is displayed on the first display 31 and the second display 32.

Further, the vehicle 100 includes speakers 42 and 52. The steering wheel 5 includes steering switches 43 and 44 for providing instructions, such as instructions for setting the automated driving control or the driving assistance control, and instructions for changing volume output from the speakers 42 and 52.

Referring to FIG. 2, the vehicle 100 includes: a speed sensor 61 for detecting a traveling speed of the vehicle 100; a front camera 62 for capturing an image of an area forward of the vehicle 100; and a radar 63 for detecting a position of a target object existing in the surroundings of the vehicle 100. The travel control apparatus 60 performs the automated driving control and the driving assistance control of the vehicle 100 on the basis of the traveling speed of the vehicle 100 detected by the speed sensor 61, a situation in an area forward of the vehicle 100 recognized from an image captured by the front camera 62, a position of a target object in the surroundings of the vehicle 100 detected by the radar 63, and the like. The driving assistance control includes control such as ACC (Adaptive Cruise Control), LKAS (Lane Keeping Assist System), CMBS (Collision Mitigation Brake System), and the like.

The display control apparatus 1 is a control unit including a processor 10, a memory 20, and the like. The display control apparatus 1 is coupled with the communication unit 30, the first display 31, the second display 32, the driver seat camera 40, the driver seat microphone 41, the speakers 42 and 52, the front passenger seat camera 50, the front passenger seat microphone 51, and the travel control apparatus 60.

The memory 20 includes a program 21 retained therein for the control of the display control apparatus 1. The program 21 may be read from a recording medium (a magnetic disk, an optical disk, a flash memory, etc.) for retention in the memory 20, or downloaded from an external server via a communication network 200 for retention in the memory 20.

By reading and executing the program 21, the processor 10 functions as: a virtual meeting control section 11; an on-demand service use control section 12; an interactive communication recognition section 13; a drive situation recognition section 14; and a display control section 15. Processing executed by the interactive communication recognition section 13 corresponds to an interactive communication recognition step in a display control method of the present disclosure, and processing executed by the display control section 15 corresponds to a display control step in the display control method of the present disclosure.

The virtual meeting control section 11 executes processing to support participation in a virtual meeting. FIG. 2 shows an example situation in which the driver U1 is engaged in a virtual meeting with a participant P1 using a communication terminal 251 in a building 250 external to the vehicle 100, a participant P2 using a communication terminal 261 in a building 260 external to the vehicle 100, and the like. The virtual meeting control section 11 controls participation in and exit from a virtual meeting of the driver U1 in response to a touch operation on the second display 32 by the driver U1.

FIG. 3 shows a screen of the second display 32, which accommodates the use of a virtual meeting service. On the left side of the screen of the second display 32, a navigation button 300 for selecting a navigation function (provided by a navigation system, not shown), a music button 301 for selecting playback of music (provided by a music player, not shown), and a virtual meeting button 302 for selecting virtual meeting function are shown.

When the driver U1 operates the virtual meeting button 302, the virtual meeting control section 11 accesses the virtual meeting server 210, extracts a virtual meeting that the driver U1 has registered for and can participate in, and displays a waiting screen 310 for the extracted virtual meeting on the second display 32. In the waiting screen 310, a join meeting button 311, an end meeting button 312, a microphone button 313, and a camera button 314 are displayed. Each of these buttons 311 to 314 corresponds to an operation image for performing an instructing operation related to interactive communication in the present disclosure.

The join meeting button 311 is a button for requesting to participate in a virtual meeting. In response to a touch operation on the join meeting button 311 by the driver U1, the virtual meeting control section 11 transmits information on the request for participation in the virtual meeting to the virtual meeting server 210. This causes the virtual meeting server 210 to execute processing for participation of the driver U1 in the virtual meeting, resulting in the driver U1 participating in the virtual meeting. The virtual meeting control section 11 switches the screen of the second display 32 to an in-progress meeting screen 320. In the in-progress meeting screen 320, a virtual meeting screen 321 is displayed, which is shared and viewed by the driver U1 and other participants P1, P2 and the like.

The end meeting button 312 is a button for requesting to end the participation in the virtual meeting (for the driver U1 to leave the virtual meeting). In response to a touch operation on the end meeting button 312 by the driver U1, the virtual meeting control section 11 transmits information on the request for ending the participation in the virtual meeting to the virtual meeting server 210. This causes the virtual meeting server 210 to execute processing for ending the participation of the driver U1 in the virtual meeting.

The microphone button 313 is a button for providing an instruction for switching the driver seat microphone 41 between ON and OFF. The camera button 314 is a button for providing an instruction for switching the driver seat camera 40 between ON and OFF. When each of the driver seat microphone 41 and the driver seat camera 40 is switched to ON or OFF, the respective display for the microphone button 313 and the camera button 314 is switched accordingly. FIG. 3 shows an example in which the driver seat camera 40 has been turned OFF, resulting in a slanting line displayed on the camera button 314, and the driver seat microphone 41 has been turned ON.

The virtual meeting control section 11 converts speech of the driver U1, which is input to the driver seat microphone 41, into digital data and transmits the digital data to a communication terminal of another participant via the virtual meeting server 210. Additionally, the virtual meeting control section 11 converts digital data of speech, which is transmitted from the communication terminal of the other participant via the virtual meeting server 210, into a sound signal and outputs the signal from the speakers 42 and 52.

Furthermore, the virtual meeting control section 11 transmits an image of the driver U1, which is captured by the driver seat camera 40, to the communication terminal of the other participant via the virtual meeting server 210, and displays an image of the other participant, which is received from the communication terminal of the other participant via the virtual meeting server 210, on the virtual meeting screen 321. Furthermore, the virtual meeting control section 11 performs other processing, such as processing to display a meeting material, which is shared among the participants during a virtual meeting, on the virtual meeting screen 321.

The on-demand service use control section 12 performs control for a service to use on-demand music content, which is an item from a menu provided in response to a touch operation on the music button 301 by the driver U1 or the passenger U2. Specifically, in response to a requesting operation by the driver U1 or the passenger U2, the on-demand service use control section 12 receives and obtains music content from an on-demand service server 220 and plays the obtained music content for output from the speakers 42 and 52.

The interactive communication recognition section 13 recognizes that interactive communication (dialogic, bidirectional, conversational, or other types of communication) is taking place between the vehicle 100 and a communication entity external to the vehicle 100, such as the virtual meeting server 210 and the on-demand service server 220. The drive situation recognition section 14 recognizes a drive situation of the vehicle 100 on the basis of traveling condition information of the vehicle 100, which is output from the travel control apparatus 60. The traveling condition information includes the traveling speed, setting of a drive mode (NORMAL, SPORT, ECO, etc.), a fuel consumption, a traveling distance, the ON/OFF state of the driving assistance control, the ON/OFF state of the automated driving control, and other information pertaining to the vehicle 100.

When the interactive communication recognition section 13 recognizes that interactive communication is taking place between the vehicle 100 and a communication entity external to the vehicle 100, the display control section 15 performs processing to change what is displayed on the first display 31 in accordance with the drive situation of the vehicle 100, which is recognized by the drive situation recognition section 14.

2. Processing of Display Control

Figure 4:
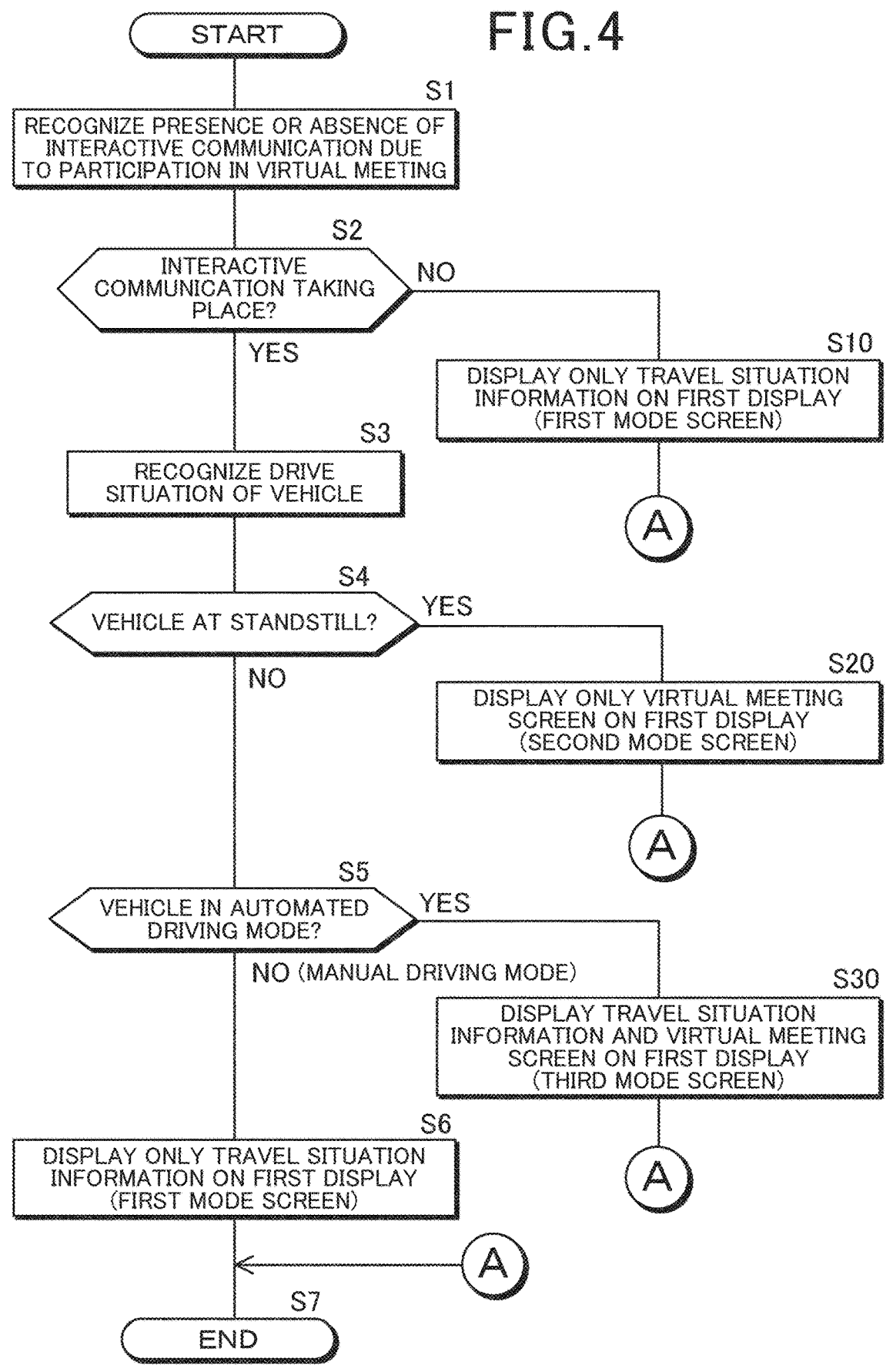
FIG. 4 is a flowchart for processing to switch display modes for a first display.

Processing of display control on the first display 31 performed by the display control apparatus 1 is described below with reference to a flowchart in FIG. 4. FIG. 4 describes processing applied when the driver U1 participates in a virtual meeting.

Referring to FIG. 4, in step S1, the interactive communication recognition section 13 recognizes whether the driver U1 is engaged in a virtual meeting and interactive communication is taking place between the vehicle 100 and the virtual meeting server 210. In subsequent step S2, if the interactive communication recognition section 13 recognizes that interactive communication is taking place, the display control section 15 proceeds to step S3, and if the interactive communication recognition section 13 does not recognize that the interactive communication is taking place, the display control section 15 proceeds to step S10. If the driver U1 is engaged in a virtual meeting, the display control section 15 displays the in-progress meeting screen 320 (see FIG. 3) on the second display 32, as described above.

Figure 5:
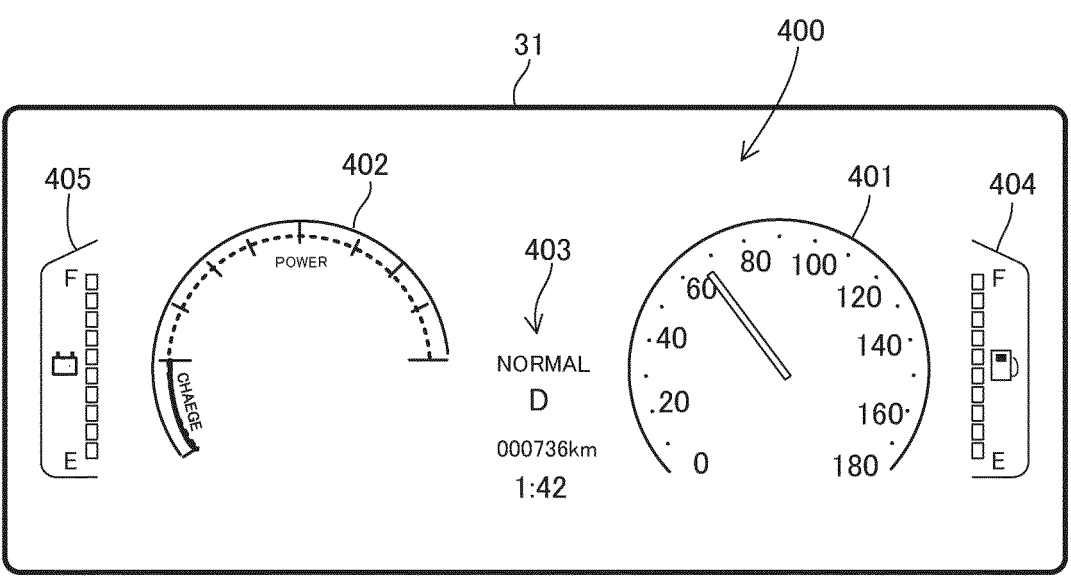
FIG. 5 is a diagram for describing a screen of the first display in a first mode.

In step S10, the display control section 15 displays a first mode screen 400, which indicates travel situation information of the vehicle 100, on the first display 31 as shown in FIG. 5 and proceeds to step S7. The first mode screen 400 displays a meter 401 for indicating the traveling speed, a meter 402 for indicating the output and regeneration of an electric motor, an indicator 404 for showing a remaining amount of fuel, an indicator 405 for showing a remaining amount of charge of a battery, a multi-information area 403 for indicating the drive mode, shift position, etc., and the like.

In step S3, the drive situation recognition section 14 recognizes a drive situation of the vehicle 100 on the basis of the traveling condition information output from the travel control apparatus 60. In subsequent step S4, if the drive situation recognition section 14 recognizes that the vehicle 100 is at a standstill, the display control section 15 proceeds to step S20, and if the drive situation recognition section 14 does not recognize that the vehicle 100 is at a standstill, the display control section 15 proceeds to step S5.

Figure 6:
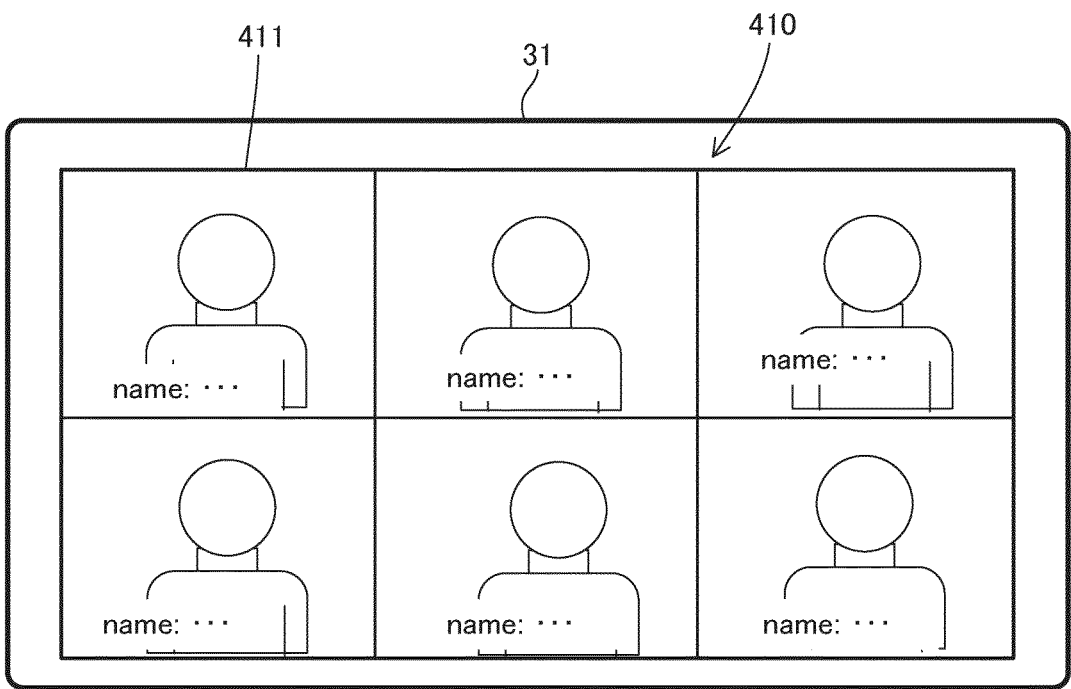
FIG. 6 is a diagram for describing a screen of the first display in a second mode.

In step S20, the display control section 15 displays a second mode screen 410, which shows only a virtual meeting screen 411, on the first display 31 as shown in FIG. 6 and proceeds to step S7. When the vehicle 100 is at a standstill as described above and there is no need for the driver U1 to check information for a driving operation of the vehicle 100, displaying the virtual meeting screen 411 on the first display 31, which is located in front of the driver U1 and can be viewed easily by the driver U1, can facilitate the driver U1 using the virtual meeting service.

In step S5, if the drive situation recognition section 14 recognizes that the vehicle 100 is in an automated driving mode, the display control section 15 proceeds to step S30, and if the drive situation recognition section 14 does not recognize that the vehicle 100 is in the automated driving mode, the display control section 15 proceeds to step S6.

Figure 7:
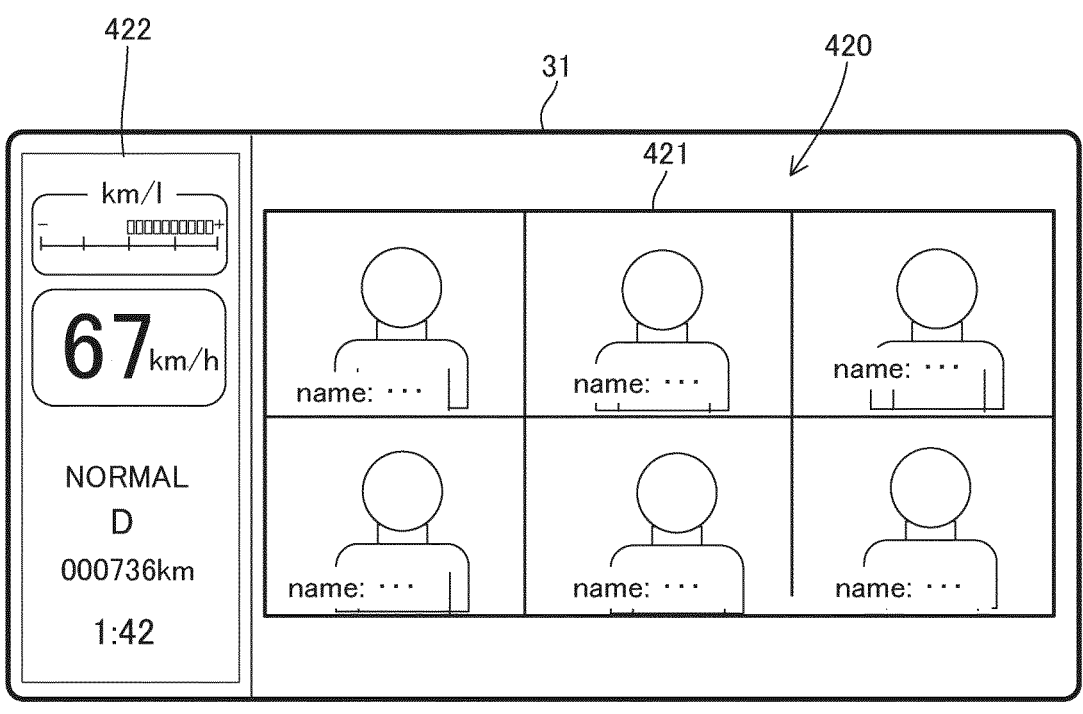
FIG. 7 is a diagram for describing a screen of the first display in a third mode.

In step S30, the display control section 15 displays a third mode screen 420, which displays a virtual meeting screen 421 and travel situation information 422, on the first display 31 as shown in FIG. 7 and proceeds to step S7. The travel situation information 422 indicates an instantaneous fuel consumption, the traveling speed, the drive mode, the shift position, the traveling distance, and the time. When the vehicle 100 is in the automated driving mode and the load on the driver U1 of checking the travel situation of the vehicle 100 is reduced, displaying the virtual meeting screen 421 together with the travel situation information 422 on the first display 31 as described above can facilitate the driver U1 using the virtual meeting service while the driver U1 is traveling in the vehicle 100.

In step S6, the display control section 15 displays the first mode screen 400, shown in FIG. 5, on the first display 31, as in step S10.

The processing of display control performed when the driver U1 uses the virtual meeting service has been described with reference to FIG. 4, and similar processing is performed when the driver U1 uses an on-demand content provision service. When the on-demand content provision service is used, a content selection screen is displayed in place of the virtual meeting screen 411 of the second mode screen 410 shown in FIG. 6, and a content selection screen is displayed in place of the virtual meeting screen 421 of the third mode screen 420 shown in FIG. 7.

3. Other Embodiments

The virtual meeting screen and the content information screen for music content provided on-demand are described as examples of predetermined information of the present disclosure in the embodiment described above, where the predetermined information is to be displayed on the first display 31. The predetermined information of the present disclosure may be any information received through interactive communication. For example, the predetermined information may be an image of a person on the other end of a video call or a content information screen for video content.

In the embodiment described above, the screen of the first display 31 is switched to any one of the first mode screen, the second mode screen, and the third mode screen in accordance with the drive situation of the vehicle 100, as shown in FIG. 4. In another embodiment, the screen of the first display 31 may be switched to any one of the first mode screen, the second mode screen, and the third mode screen in accordance with an element other than the drive situation of the vehicle 100. Furthermore, the screen of the first display 31 may be switched between any two screens of the first mode screen to the third mode screen, instead of between all the screens of the first mode screen to the third mode screen.

While, as the mobile body of the present disclosure, the vehicle 100 is described in the embodiment described above, the mobile body of the present disclosure may be a flight vehicle, a watercraft, or the like.

While FIG. 2 is a schematic view showing the configuration of the display control apparatus 1 divided in accordance with respective major processing to facilitate understanding of the present application of the present invention, the configuration of the display control apparatus 1 may be divided in any other way. Furthermore, the processing of each constituent element may be executed by one hardware unit or by a plurality of hardware units. Furthermore, the processing performed by each constituent element shown in FIG. 4 may be executed by one program or a plurality of programs.

4. Configurations Supported by the Foregoing Embodiments

The embodiments described above provide specific examples of the configuration described below.

(First configuration) A display control apparatus including: an interactive communication recognition section configured to recognize that interactive communication is taking place between a mobile body and a communication entity external to the mobile body; and a display control section configured to, when the interactive communication recognition section recognizes that interactive communication is taking place between the mobile body and the communication entity, display predetermined information transmitted by the communication entity to the mobile body through the interactive communication on a first display disposed in front of a driver seat of the mobile body and display an operation image for receiving an instructing operation related to the interactive communication on a second display of a touch panel type disposed diagonally forward of the driver seat of the mobile body.

In accordance with the display control apparatus of the first configuration, an environment can be provided that allows a driver of the mobile body, such as a vehicle, to view information on a display and perform necessary operations easily when the driver uses a service through interactive communication.

(Second configuration) The display control apparatus according to the first configuration, including a drive situation recognition section configured to recognize a drive situation of the mobile body, wherein the display control section changes what is displayed on the first display in accordance with a drive situation of the mobile body recognized by the drive situation recognition section.

In accordance with the display control apparatus of the second configuration, what is displayed on the first display can be changed depending on the level of capacity of the driver for viewing the first display, where the level of capacity varies with the drive situation of the mobile body.

(Third configuration) The display control apparatus according to the second configuration, wherein the display control section displays the predetermined information on the first display when the drive situation recognition section recognizes that the mobile body is in an automated driving mode.

In accordance with the display control apparatus of the third configuration, when the mobile body is in an automated driving mode and the need for the driver to recognize the travel situation of the mobile body is lowered, displaying content transmitted through interactive communication on the first display disposed in front of the driver seat can facilitate the driver viewing the content.

(Fourth configuration) The display control apparatus according to the second configuration, wherein, in accordance with a drive situation of the mobile body recognized by the drive situation recognition section, the display control section switches between: a first mode in which only travel situation information indicative of a travel situation of the mobile body, from among the travel situation information and the predetermined information, is displayed on the first display; a second mode in which only the predetermined information, from among the travel situation information and the predetermined information, is displayed on the first display; and a third mode in which the travel situation information and the predetermined information are displayed on the first display.

In accordance with the display control apparatus of the fourth configuration, priority given to the travel situation information for display on the first display and priority given to the content transmitted through interactive communication for display on the first display can be switched depending on the drive situation of the mobile body by using the first mode to the third mode.

(Fifth configuration) The display control apparatus according to fourth configuration, wherein, in the third mode, the display control section decreases a display range for the travel situation information on the first display to be smaller than a display range for the predetermined information on the first display.

In accordance with the display control apparatus of the fifth configuration, when content transmitted through interactive communication and travel situation information are displayed on the first display in the third mode, the viewability of the content transmitted through interactive communication can be improved to be better than that of the travel situation information.

(Sixth configuration) The display control apparatus according to any one of the first configuration to the fifth configuration, wherein the predetermined information includes a virtual meeting screen transmitted by the communication entity to the mobile body in response to participation in a virtual meeting from the mobile body.

In accordance with the display control apparatus of the sixth configuration, displaying the virtual meeting screen on the first display disposed in front of the driver seat can facilitate the driver viewing the virtual meeting screen.

(Seventh configuration) A display control method to be executed by a computer, the method including: an interactive communication recognition step of recognizing that interactive communication is taking place between a mobile body and a communication entity external to the mobile body; and a display control step of, when the interactive communication recognition step recognizes that interactive communication is taking place between the mobile body and the communication entity, displaying predetermined information transmitted by the communication entity to the mobile body through the interactive communication on a first display disposed in front of a driver seat of the mobile body and displaying an operation image for receiving an instructing operation related to the interactive communication on a second display of a touch panel type disposed diagonally forward of the driver seat of the mobile body.

A computer executing the display control method of the seventh configuration can provide operation and effect similar to that of the display control apparatus of the first configuration.

(Eighth configuration) A non-transitory recording medium storing a program that causes a computer to function as: an interactive communication recognition section that recognizes that interactive communication is taking place between a mobile body and a communication entity external to the mobile body; and a display control section that, when the interactive communication recognition section recognizes that interactive communication is taking place between the mobile body and the communication entity, displays predetermined information transmitted by the communication entity to the mobile body through the interactive communication on a first display disposed in front of a driver seat of the mobile body and displays an operation image for receiving an instructing operation related to the interactive communication on a second display of a touch panel type disposed diagonally forward of the driver seat of the mobile body.

A computer executing the program of the eighth configuration can provide the configuration of the display control apparatus of the first configuration.

REFERENCE SIGNS LIST 1 display control apparatus
10 processor
11 virtual meeting control section
12 on-demand service use control section
13 interactive communication recognition section
14 drive situation recognition section
15 display control section
20 memory
21 program
30 communication unit
31 first display
32 second display
40 driver seat camera
41 driver seat microphone
42, 52 speaker
50 front passenger seat camera
51 front passenger seat microphone
60 travel control apparatus
61 speed sensor
62 front camera
63 radar
100 vehicle
200 communication network
210 virtual meeting server 220 on-demand service server
310 waiting screen
320 in-progress meeting screen
400 first mode screen
410 second mode screen
411 virtual meeting screen
420 third mode screen
421 virtual meeting screen
422 travel situation information
U1 driver

What is claimed is:

1. A display control apparatus comprising a processor configured to:

recognize that interactive communication is taking place between a mobile body and a communication entity external to the mobile body;

recognize that interactive communication is taking place between the mobile body and the communication entity, display predetermined information transmitted by the communication entity to the mobile body through the interactive communication on a first display disposed in front of a driver seat of the mobile body and display an operation image for receiving an instructing operation related to the interactive communication on a second display of a touch panel type disposed diagonally forward of the driver seat of the mobile body; and recognize a drive situation of the mobile body, wherein in accordance with the drive situation of the mobile body, the processor switches between:

a first mode in which only travel situation information indicative of the travel situation of the mobile body, from among the travel situation information and the predetermined information, is displayed on the first display, a second mode in which only the predetermined information, from among the travel situation information and the predetermined information, is displayed on the first display, and a third mode in which the travel situation information and the predetermined information are displayed on the first display, when recognizing that the mobile body is at a standstill, the processor sets the second mode, when recognizing that the mobile body is in an automated driving mode, the processor sets the third mode, and when not recognizing that the mobile body is at the standstill and not recognizing that the mobile body is in the automated driving mode, the processor sets the first mode.

2. The display control apparatus according to claim 1, wherein, in the third mode, the display control section decreases a display range for the travel situation information on the first display to be smaller than a display range for the predetermined information on the first display.

3. The display control apparatus according to claim 1, wherein the predetermined information includes a virtual meeting screen transmitted by the communication entity to the mobile body in response to participation in a virtual meeting from the mobile body.

4. A display control method to be executed by a computer, the method comprising:

recognizing that interactive communication is taking place between a mobile body and a communication entity external to the mobile body;

when recognizing that interactive communication is taking place between the mobile body and the communication entity, displaying predetermined information transmitted by the communication entity to the mobile body through the interactive communication on a first display disposed in front of a driver seat of the mobile body and displaying an operation image for receiving an instructing operation related to the interactive communication on a second display of a touch panel type disposed diagonally forward of the driver seat of the mobile body; and recognizing a drive situation of the mobile body, wherein in accordance with the drive situation of the mobile body, the computer switches between:

a first mode in which only travel situation information indicative of the travel situation of the mobile body, from among the travel situation information and the predetermined information, is displayed on the first display, a second mode in which only the predetermined information, from among the travel situation information and the predetermined information, is displayed on the first display, and a third mode in which the travel situation information and the predetermined information are displayed on the first display, when recognizing that the mobile body is at a standstill, the computer sets the second mode, when recognizing that the mobile body is in an automated driving mode, the computer sets the third mode, and when not recognizing that the mobile body is at the standstill and not recognizing that the mobile body is in the automated driving mode, the computer sets the first mode.

5. A non-transitory recording medium storing a program that causes a computer to function as:

an interactive communication recognition section that recognizes that interactive communication is taking place between a mobile body and a communication entity external to the mobile body;

a display control section that, when the interactive communication recognition section recognizes that interactive communication is taking place between the mobile body and the communication entity, displays predetermined information transmitted by the communication entity to the mobile body through the interactive communication on a first display disposed in front of a driver seat of the mobile body and displays an operation image for receiving an instructing operation related to the interactive communication on a second display of a touch panel type disposed diagonally forward of the driver seat of the mobile body; and a drive situation recognition section configured to recognize a drive situation of the mobile body, wherein in accordance with the drive situation of the mobile body, the display control section switches between:

a first mode in which only travel situation information indicative of the travel situation of the mobile body, from among the travel situation information and the predetermined information, is displayed on the first display, a second mode in which only the predetermined information, from among the travel situation information and the predetermined information, is displayed on the first display, and

13 a third mode in which the travel situation information and the predetermined information are displayed on the first display, when recognizing that the mobile body is at a standstill, the display control section sets the second mode when recognizing that the mobile body is in an automated driving mode, the display control section sets the third mode, and when not recognizing that the mobile body is at the standstill and not recognizing that the mobile body is in the automated driving mode, the display control section sets the first mode.

\* \* \* \* \*

14